Nov. 15, 1927.  1,649,579

T. A. EDISON

STORAGE BATTERY ELECTRODE ELEMENT AND PRODUCTION THEREOF

Filed July 24, 1925

INVENTOR
Thomas A. Edison
BY
Henry Lanahan
ATTORNEY

Patented Nov. 15, 1927.

1,649,579

UNITED STATES PATENT OFFICE.

THOMAS A. EDISON, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

STORAGE-BATTERY ELECTRODE ELEMENT AND PRODUCTION THEREOF.

Application filed July 24, 1925. Serial No. 45,781.

My invention relates to storage battery electrode elements and more particularly to electrode elements designed for use in storage battery cells having the same general characteristics as the cell disclosed in Patent No. 1,377,194 granted to me on May 10, 1921, and to the production of such elements. Although electrode elements in accordance with my invention are designed especially for use in connection with Edison storage battery cells, wherein nickel hydroxide is opposed to finely divided electrolytically active iron or oxide of iron in an alkaline solution as the electrolyte, it is to be distinctly understood that my invention is not limited in its application to cells of this type.

In the cell disclosed in the patent referred to, a battery pile of special construction is employed in the place of the usual plate assembly in Edison storage battery cells. This battery pile comprises a series of very thin conductive contact sheets, preferably of nickel, separated by insulating sheets preferably of asbestos paper, with thin flat layers of finely divided active material respectively disposed between the surfaces of each of the nickel sheets and the adjacent asbestos sheets, the whole being held together under great pressure with the layers of active material in firm close surface contact with the respective nickel sheets. The layers of active material for the negative elements preferably consist of electrolytically active finely divided iron or oxide of iron, preferably mixed with a small amount of mercury, and the layers of active material for the positive elements preferably consist of finely divided nickel hydroxide. Other suitable active materials may however, be employed instead of the finely divided iron and nickel hydroxide; for example, in place of finely divided iron as the active material for the negative elements, finely divided cadmium or cobalt may be employed; and in place of nickel hydroxide as the active material for the positive elements, an oxide of cobalt may be employed.

In making up a battery pile, of a type similar to that described above, I have heretofore proceeded as follows: The insulating sheets, preferably of asbestos, used in the battery pile were first coated by a wet process on one side with a thin layer of finely divided iron or oxide of iron, and on the other side with a thin layer of nickel hydroxide. These coated asbestos sheets were then partially dried and subjected to enormous pressure, for example a pressure of several tons per square inch, so as to compact the layers of active material and form the same with very smooth flat surfaces. The proper number of coated asbestos sheets were then superimposed with one of the thin nickel contact sheets between each two adjacent asbestos sheets in such a manner that one of each two adjacent nickel sheets was engaged on each side with a layer of the electrolytically active iron or oxide of iron and the other was engaged on each side with a layer of the electrolytically active nickel hydroxide, so as to form a pile with electrode elements which were alternately negative and positive. This superimposed pile was then subjected to great pressure and secured together under pressure by means of heavy clamping or pressure plates at either end of the pile and two bolts or rods extending through the clamping plates and also through the elements of the pile, and nuts threaded on said rods. These rods served as the poles of the battery pile, for one of said rods contacted only the contact sheets of the negative electrode elements of the pile and the other of said rods contacted only the contact sheets of the positive electrode elements of the pile. This was accomplished by providing the contact sheets of each electrode element with two openings through which the said rods respectively extended, the opening for one rod being of such size that the rod fitted very closely therein, and the opening for the other rod being of somewhat greater size so that the rod which extended therethrough was spaced from the wall of such opening.

Cells constructed as above described, however, become unduly heated both on charge and discharge, the capacity of such cells, especially at high discharge rates, is considerably below that which should be obtained, and the capacity decreases to some extent with the length of time the cells are in use. These conditions are, I believe, correctly explained as follows:

In a cell so constructed, the surface contact of the nickel conductive sheets and the layers of active material engaging the same is so close and said layers of active material are so compacted because of the great pressure to which said layers were subjected in forming the battery pile, and also because of the pressure under which the pile is maintained, that it is extremely difficult for any appreciable amount of the electrolyte to gain access to the layers of active material except such portions thereof as are directly exposed to or closely adjacent the body of the electrolyte in the cell. Moreover, the internal resistance and heating of such a cell both on charge and discharge are materially increased by osmotic action. This action takes place in the direction of the flow of current and when the cell is on charge has the effect of driving the small amount of electrolyte which might otherwise reach those portions of the layers of active material of the positive electrode elements which are remote from the body of the electrolyte, away from the adjacent surface portions of the conductive contact sheets of such elements; while when the cell is discharged it has the effect of driving the electrolyte which might otherwise reach the corresponding portions of the layers of active material of the negative elements, away from the adjacent surface portions of the conductive contact sheets of these elements. When the electrolyte is thus driven away from the conductive contact sheets of the electrode elements, the adjacent active material is rendered practically dry and as such material is a very poor conductor when dry, the electrical resistance thereof and the internal resistance of the cell will thereupon be greatly increased.

My invention is especially directed to the production of electrode elements comprising coated sheets of asbestos or other suitable insulating material which are in general, similar to the coated asbestos insulating sheets produced in carrying out the process above described, and resides in an improved form of electrode element of this character whereby in cells comprising battery piles made up of such elements, the circulation of the electrolyte will be so improved and increased as to insure a constant and copious supply of electrolyte to all portions of the various layers of active materials of the electrode elements both on charge and discharge. My invention also resides in an improved process or method of producing such coated insulating sheets and in improved apparatus adapted for carrying out such process. My co-pending application Serial No. 225,619, filed October 12, 1927, is a division hereof and contains claims covering my improved apparatus.

My improved process is essentially a dry process and I have discovered that coated insulating sheets such as those referred to, may be produced much more economically by such process than by the wet process heretofore used. Briefly described, such improved process consists in applying to one or each side of a support preferably a sheet of fibrous insulating material such as asbestos, a thin and preferably channeled layer of finely divided active material in a dry loose state free from a binder, the layer or layers of active material being applied to the sheet in such a way as to be of substantially uniform thickness. The asbestos sheet with the channeled layer or layers of active material applied thereto is then subjected, as by means of a hydraulic press, to a very heavy pressure, for example, a pressure of from 2 to 10 tons per square inch. Under this enormous pressure each layer of dry finely divided loose active material is firmly united to the insulating sheet and is agglomerated and compacted into a dense coherent but channeled sheet or layer of such material of substantially uniform thickness, this layer being formed wholly of active material and being free from any binder. Where both sides of the insulating sheet are coated with active material, one layer consists of active material for the negative electrode elements, preferably iron or oxide of iron, and the other layer consists of active material for the positive electrode element, preferably nickel hydroxide. When coated insulating sheets produced as just described are provided with a layer of active material on but one side, two of these coated sheets are superimposed with their uncoated surfaces or sides in engagement and then subjected to a sufficiently high pressure to firmly unite the insulating sheets and thus form a single element consisting of an insulating sheet provided on one side with a channeled surface layer of nickel hydroxide and on the other side with a channeled surface layer of iron or oxide of iron.

Other objects and features of my invention will be hereinafter more fully described and claimed.

In order that my invention may be more clearly understood, attention is directed to the drawing accompanying and forming a part of this specification, and in which.

Figure 1:
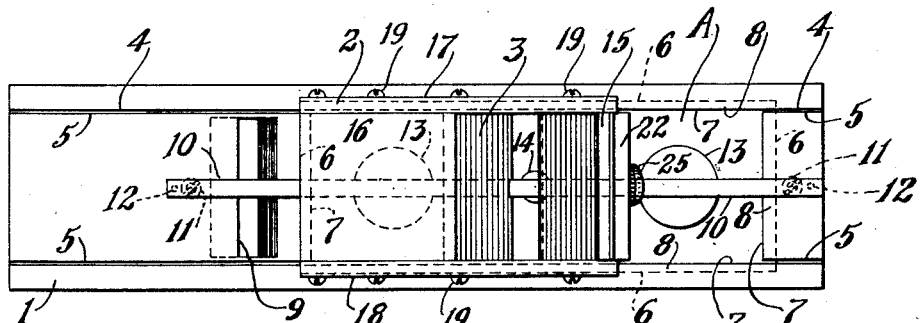
Figure 1 is a plan view of one form of my improved apparatus for applying layers of finely divided dry active material to insulating sheets or other supports, in accordance with my improved process.
Figure 2:
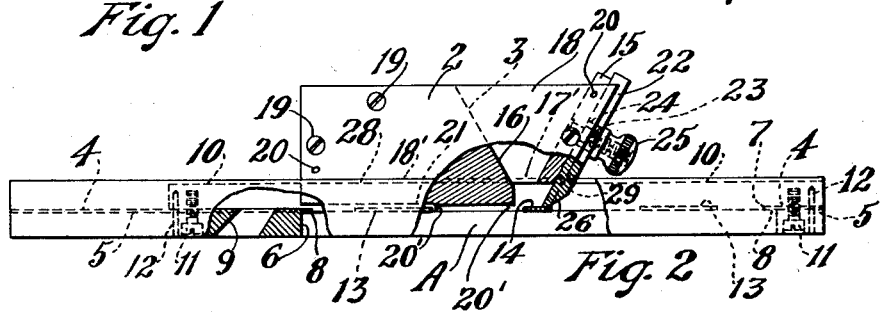
Figure 2 is a view in side elevation, partly in section, of the apparatus shown in Figure 1.
Figure 6:
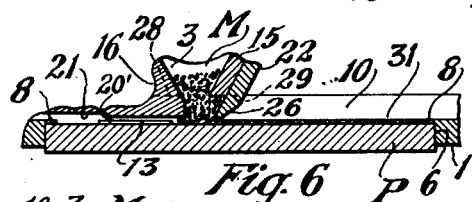
Figure 7:
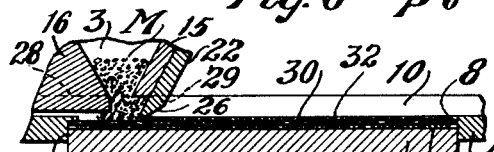
Figure 8:
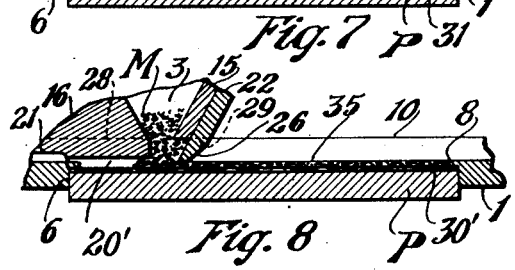

Figures 6 and 7 are detailed sectional views of the apparatus shown in Figs. 1 and 2, illustrating how the same is used in applying a channeled layer of active material to each side of an insulating sheet; and Figure 8 is a view similar to Figures 6 and 7, showing how the apparatus is used in applying a channeled layer of active material to but one side of an insulating sheet.

Referring to the drawing, the apparatus for applying the active material to the insulating sheets comprises a rectangular channeled base 1 and a device 2 slidably mounted on said base and provided with a hopper 3. The channel 4 extends the whole length of the base 1 and is provided at its opposite sides with guiding grooves 5. The base 1 has a large rectangular opening A extending therethrough, said opening comprising a lower section 6 of the same shape and size as the insulating sheets to be coated, and an upper section 7 of reduced area intercepting the bottom of the channel 4 and having the same size and shape as the coatings of active material to be applied to the insulating sheets, the construction and arrangement being such that the opposite side walls of the section 7 of the opening A are respectively in the same planes as the opposite side walls of the channel 4. The opening A is provided with flanges 8 on all four sides, which flanges define the section 7 of the opening, are flush with the bottom of the channel 4 and have a thickness corresponding to the desired thickness of the layers of active material applied to the insulating sheets before subjecting the same to pressure. At a small distance beyond one end of opening A, the bottom of the channel 4 of base 1 is also provided with an inclined opening 9 extending therethrough and transversely thereof, the said opening 9 providing for the discharge of the surplus active material deposited from the hopper 3 of the apparatus in applying a layer of such material to an insulating sheet or other support, as will be hereinafter described. To provide each layer of the active material of the finished elements with suitable circulating channels, and to prevent the active material from being applied to the edge portions of the insulating sheets or supports, means are provided for blocking out certain portions of the said sheets or supports, this means as shown consisting of the flanges 8 already referred to, and a member 10 which is preferably in the form of a rectangular bar and which is suitably secured as by means of screws 11, to the bottom of the channel 4 of the base. The bar 10 extends entirely across the opening A and it is important that said bar be secured to the base 1 so that it will be midway between the opposite side walls of the section 7 of such opening. To attain this result the base 1 is provided with centering pins 12 which respectively engage openings formed in the bar 10 adjacent the ends thereof as shown. The lower surfaces of the end portions of bar 10 closely engage the bottom of the channel 4, while the intermediate portion of said bar is formed to extend downwardly within the section 7 of the opening A with the lower surface thereof flush with the lower surfaces of the flanges 8. That portion of the bar 10 which extends within the section 7 of the opening A is provided adjacent its ends with enlarged circular portions 13 the lower surfaces of which are flush with the lower surfaces of the flanges 8, and midway between its ends with another similar but smaller circular portion 14.

The hopper device 2 comprises two members 15 and 16 having spaced opposed oppositely inclined walls between which the hopper 3 is formed, said members being secured between two side plates 17 and 18 by means of screws 19 and rivets 20. The members 15 and 16 of the hopper device 2 are a little less in width than the channel 4 of the base 1, and the hopper device is removably positioned on the base with the lower portions of the members 15 and 16 disposed in the channel 4 and with shoulders 17′ and 18′ formed adjacent the lower edges of the side plates 17 and 18 resting upon the tracks provided by the upper surfaces of the sides of the channel. The parts of the hopper device are so constructed and arranged that when the device is thus positioned, the lower edge of member 15 will lie closely adjacent the upper surface of the bar 10 and there will be a slight clearance between the lower surface of that portion of the hopper member 16 adjacent the discharge opening of the hopper and the bottom of the channel 4 and the upper surfaces of the enlarged circular portions 13 and 14 of bar 10. The reduced portions of the side plates 17 and 18 below the shoulders 17′ and 18′ are of such thickness that when the hopper device 2 is in the position described, they will lie very close to the adjacent side walls of the channel 4. The bottom edges of the side plates 17 and 18 for the major portion of the length of said plates, are flush with the bottom of the hopper member 16, but are provided at the end portions thereof adjacent the hopper 3 with downward extensions 20′ which engage and fit closely within the guiding grooves 5 in the bottom of the channel 4. To facilitate the sliding movement of the hopper device 2 on the base 1, the bottom of the member 16 and the side plates 17 and 18, for a considerable distance from the left hand end of the hopper device 2, are reduced in height or cut back as indicated at 21 to increase the clearance between this part of the hopper device and the bottom of the channel 4. A plate 22 is adjustably secured against the outer face of the hopper member 15 by means of a bolt 23 secured at one end to the hopper member 15 and extending through an enlarged opening 24 in the plate 22, and a nut 25 threaded on the outer end of said bolt. The inclined plate 22 is provided with a lower beveled end portion 26 and this plate is secured to member 15 so that when the hopper device 2 is in place the bottom edge of the plate will be in substantially the same plane as the top surfaces of the flanges 8 and of the enlarged portions 13 and 14 of member 10. In case the lower end portion of the plate 22 becomes worn the plate may readily be adjusted to proper position upon loosening the nut 25. The hopper member 16 is provided on its under side and centrally thereof with a longitudinally extending rectangular recess 28 and the plate 22 is provided with a similar recess 29 aligned with the recess 28, said recesses being engaged by the bar 10 when the hopper device 2 is positioned on the base 1.

Figure 3:
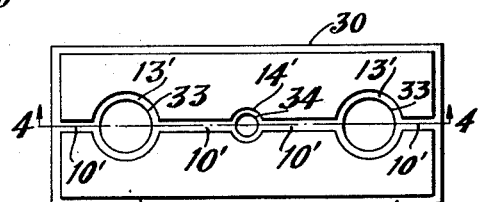
Figure 3 is a plan view of an electrode element in accordance with my invention.
Figure 4:
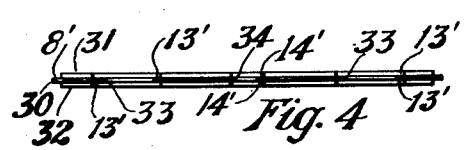
Figure 4 is a sectional view on line 4—4 of Figure 3.

In Figs. 3 and 4 I have shown an improved electrode element in accordance with my invention and consisting of an asbestos or other insulating sheet 30 having on one side a thin layer of iron-containing material, such as iron or oxide of iron, and on the other side a thin layer of nickel hydroxide. Adjacent its ends and midway between its side edges the asbestos sheet 30 is provided with circular openings 33 through which the poles of the battery pile extend when a plurality of the electrode elements are assembled into a battery pile, as described above. The sheet 30 is also provided with a smaller central circular opening 34, and when a plurality of elements such as described are assembled into a battery pile, the central openings thereof provide a path for the circulation of electrolyte. To prevent the layers of active material on the asbestos sheet 30 from shedding or being broken off at their edges, and from coming into contact with the poles which are to extend through the openings 33, and in order to further facilitate the circulation of electrolyte, each surface of the insulating sheet is provided with uncovered portions carrying no active material, namely, the edge portions 8', the annular portions 13' and 14' surrounding the openings 33 and 34, and the straight narrow portions or channels 10' located midway of the edges of the sheet and extending between the annular portions 13' and 14' and from the annular portions 13' to the ends of the layer of active material. Obviously the corresponding channels in the layers of active material as well as the other corresponding uncovered portions of the opposite surfaces of the insulating sheet will be in alignment.

Figure 5:
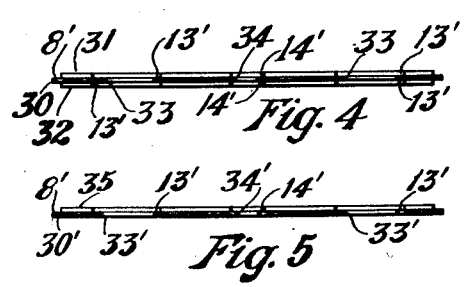
Figure 5 is a view similar to Figure 4, showing an insulating sheet having a channeled layer of active material applied to but one side or surface thereof.

The element shown in Fig. 5 is similar in all respects to the element shown in Figs. 3 and 4, except that the asbestos sheet 30' thereof has a channeled layer of active material 35 applied to but one side thereof.

In producing an electrode element such as shown in Figs. 3 and 4, I proceed as follows: A flat presser plate P of the same size as the lower section 6 of the opening A in base 1, is disposed in such section 6 with the edge portions of its upper surface in engagement with the lower surfaces of flanges 8. The hopper device 2 is then positioned on the base 1 with the discharge opening of the hopper over the bottom of the channel 4 of the base at the right of opening A, and the hopper is filled with the dry, loose, finely divided active material to be deposited, for example, finely divided iron or oxide of iron. The hopper 3 is of such size as to hold a quantity of active material somewhat in excess of that necessary to form one complete layer of active material of the desired thickness. The hopper device 2 is now moved from right to left on the base 1 (referring to Figs. 1 and 2), so that the discharge opening of the hopper moves entirely across the openings A and 9. In this sliding movement of the hopper device 2 a layer 31 of finely divided iron is deposited on the upper surface of the presser plate P, such layer being of a uniform thickness equal to the thickness of flanges 8 and the enlarged circular portions 13 and 14 of bar 10 and covering all surface portions of the presser plate P except those which are blocked out by said flanges 8, member 10 and enlarged portions 13 and 14. As the active material is deposited on the presser plate P in the movement of the hopper device 2 from right to left, the edge of the lower beveled end portion 26 of the plate 22 acts as a scraper or evener, whereby the layer 31 of active material produced will be of uniform thickness and will have a flat, even upper surface. In the depositing of this layer of active material, the extensions 20' of the plates 18 and 19 act to define the edges of the layer and to prevent material being displaced laterally beyond the limits defined thereby under the action of the scraper provided by the plate 22. The surplus active material in the hopper 3, that is, the material in excess of that sufficient to form the layer 31 is discharged from the hopper through the opening 9. The presser plate P with the layer of active material 31 thereon is now removed from the base 1 and a sheet 30 of asbestos or other suitable insulating material is placed on the layer 31. The presser plate P is then again disposed in the lower section 6 of the opening A with the edge portions of the upper surface of the asbestos sheet 30 in engagement with the lower surfaces of the flanges 8. A layer 32 of dry, loose, finely divided nickel hydroxide is now deposited on the upper surface of the asbestos sheet 30 in the same manner as the layer of iron or oxide of iron was deposited on the presser plate P. The presser plate P carrying the layers of active material 31 and 32 and the intermediate asbestos sheet 30 is now removed from the base 1, a second presser plate similar to plate P is placed on the upper layer 32 of active material, and this assembly is then subjected to an enormous pressure, preferably a pressure of several tons per square inch, in a hydraulic press. Under this pressure the layers 31 and 32 of dry, loose, finely divided active material are compacted and formed into dense coherent channeled sheets of uniform thickness with smooth flat surfaces and are firmly united to the respective surfaces of the asbestos sheet 30.

In producing an electrode element such as that shown in Figs. 3 and 4, by joining two asbestos or other insulating sheets each having a channeled layer of active material on but one side, I proceed as follows: A presser plate P with an insulating sheet 30' thereon is disposed within the lower section 6 of opening A, with the edge portions of the asbestos sheet in engagement with the lower surfaces of flanges 8, as shown in Fig. 8. A layer of dry, loose, finely divided active material 35 is then deposited on the asbestos sheet 30' from the hopper 3 in the manner above described. The presser plate P carrying the sheet 30' and the layer of active material 35 is now removed from the base 1, another presser plate similar to plate P is placed on the layer 35, and this assembly is then subjected to enormous pressure, as described above, to compact and form the layer of active material 35 into a dense coherent sheet of uniform thickness, and at the same time to unite such layer firmly to the asbestos sheet 30'. This results in an element such as that shown in Fig. 5. Two such elements are then assembled with the uncoated surfaces of the insulating sheets thereof in engagement, between presser plates, and such assembly is then subjected to a heavy pressure so as to firmly unite the insulating sheets. The layers of active material on the two asbestos sheets thus united should of course be respectively formed of nickel hydroxide and iron or oxide of iron.

It is to be distinctly understood that the electrode elements as well as the method for producing the same, specifically described herein, are subject to various changes and modifications without departure from the spirit of the invention and the scope of the appended claims.

Having now fully described my invention, what I claim as new and desire to protect by Letters Patent is as follows:

1. The method of producing an element for storage battery cells which consists in pressing finely divided active material in a dry, loose state onto a support of fibrous insulating material at a pressure sufficient to unite the active material to said support, substantially as described.

2. The method of producing an element for storage battery cells which consists in pressing active material in a dry, loose state and free from a binder, onto both sides of a support of fibrous insulating material at a pressure sufficient to unite the active material to said support, substantially as described.

3. The method which consists in pressing in a dry, loose state active material for the negative electrode element of a battery cell, at a heavy pressure, onto one side of an insulating sheet, and pressing in a dry, loose state active material for the positive electrode element of a battery cell, at a heavy pressure, onto the other side of said sheet, said pressures being sufficient to unite said materials to said sheet, substantially as described.

4. The method which consists in pressing nickel hydroxide in a dry, loose state, at a heavy pressure, onto one side of a fibrous insulating sheet and pressing iron-containing material in a dry, loose state, at a heavy pressure, onto the other side of said sheet, said pressures being sufficient to unite said nickel hydroxide and said iron-containing material to said sheet, substantially as described.

5. The method which consists in applying a layer of finely divided active material in a dry, loose state to the surface of a support of fibrous insulating material and then subjecting the support with the layer of active material thereon to a pressure sufficient to compress the active material into a dense coherent sheet and firmly unite the same to said support, substantially as described.

6. The method which consists in applying a layer of finely divided active material in a dry, loose state to the surface of a support of fibrous insulating material and then subjecting the said support with the layer of active material thereon to a pressure of from 2 to 10 tons per square inch, substantially as described.

7. The method which consists in applying a layer of active material to one surface of each of two sheets of fibrous material, superimposing said sheets of fibrous material with their uncoated surfaces in contact and then subjecting the superimposed sheets to a pressure sufficient to firmly unite the same, substantially as described.

8. The method which consists in pressing active material in a dry, loose state, at a heavy pressure, onto one side of each of two sheets of fibrous material, then superimposing said sheets with their uncoated sides in contact and subjecting the superimposed sheets to a pressure sufficient to firmly unite the same, substantially as described.

9. The method which consists in applying to an insulating support a layer consisting of a mass of finely divided active material and providing such layer with channeling extending therethrough adapted to expose portions of the surfaces of said support and of the conducting element to be disposed adjacent said layer, and then subjecting such support with the active material applied thereto, to a pressure sufficient to compress the active material into a dense, coherent, channeled layer and firmly unite the same with said support, substantially as described.

10. The method which consists in depositing on an insulating support a layer of finely divided active material and partly blocking out such support during the deposition of said material thereon so that said layer will be provided with channeling extending therethrough and adapted to expose portions of the surfaces of said support and of the conducting element to be disposed adjacent said layer, and then subjecting said support with the active material applied thereto to a pressure sufficient to compress the active material into a dense coherent channeled layer and firmly unite the same with said support, substantially as described.

11. An element for storage battery cells, comprising an insulating sheet having a layer of finely divided nickel hydroxide applied to one surface thereof and a layer of finely divided electrolytically active iron applied to the opposite surface thereof, each of said layers comprising separated sections having channeling therebetween, the material of said sections being compacted into dense coherent masses, the corresponding sections of the layers on the opposite surfaces of said sheet being aligned and the channelings in each of said layers being adapted to expose portions of the surfaces of said sheet and of the conducting element to be disposed adjacent such layer, substantially as described.

12. An electrode element for storage battery cells, comprising an insulating member, and layers of active material respectively applied to the opposite surfaces of said member, each of said layers of active material having channeling therethrough adapted to expose portions of the surfaces of said insulating member and of the conducting member to be disposed adjacent such layer, the channelings of the two layers of active material being aligned so that corresponding portions of the opposite surfaces of said member are uncovered.

13. An electrode element for storage battery cells, comprising a support having an opening therethrough for the passage of electrolyte and a layer of active material applied to said support, said layer of active material having channeling therethrough communicating with said opening, substantially as described.

14. An electrode element for storage battery cells, comprising a support having an opening therethrough for the passage of electrolyte and layers of active material respectively applied to the opposite surfaces of said support, each of said layers of active material having channeling therethrough communicating with said opening, substantially as described.

This specification signed this 17th day of July, 1925.

THOS. A. EDISON.